(12) United States Patent
Wakabayashi et al.

(10) Patent No.: US 8,496,744 B2
(45) Date of Patent: Jul. 30, 2013

(54) INK COMPOSITION

(75) Inventors: Shigemi Wakabayashi, Shiojiri (JP); Kazuhiko Kitamura, Matsumoto (JP); Yasuhiro Oki, Matsumoto (JP); Motoki Masuda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 307 days.

(21) Appl. No.: 13/069,766

(22) Filed: Mar. 23, 2011

(65) Prior Publication Data
US 2011/0232526 A1 Sep. 29, 2011

(30) Foreign Application Priority Data

Mar. 23, 2010 (JP) .................................. 2010-066849

(51) Int. Cl.
*C09D 11/02* (2006.01)
(52) U.S. Cl.
USPC ..................................... 106/31.47; 106/31.49
(58) Field of Classification Search
USPC ........................................... 106/31.47, 31.49
See application file for complete search history.

(56) References Cited

U.S. PATENT DOCUMENTS

| | | | |
|---|---|---|---|
| 6,454,844 B1 | 9/2002 | Kanaya | |
| 6,786,571 B2 * | 9/2004 | Fukumoto et al. | 347/43 |
| 6,852,154 B2 * | 2/2005 | Kitamura et al. | 106/31.47 |
| 7,083,669 B2 * | 8/2006 | Fukumoto et al. | 106/31.49 |
| 7,303,616 B2 * | 12/2007 | Oki et al. | 106/31.49 |
| 2004/0122219 A1 | 6/2004 | Fujiwara et al. | |
| 2005/0115459 A1 | 6/2005 | Hanmura et al. | |
| 2006/0050119 A1 * | 3/2006 | Jackson | 347/100 |
| 2009/0285990 A1 | 11/2009 | Nishino et al. | |

FOREIGN PATENT DOCUMENTS

| | | | |
|---|---|---|---|
| EP | 1700889 A1 | | 9/2006 |
| EP | 1988134 A2 | | 11/2008 |
| JP | 2000-290559 A | | 10/2000 |
| JP | 2001-288392 A | | 10/2001 |
| JP | 2002-332419 A | | 11/2002 |
| JP | 2002-371079 A | | 12/2002 |
| JP | 2005-105136 A | | 4/2005 |
| JP | 2005-120266 A | | 5/2005 |
| JP | 2007-277314 A | | 10/2007 |
| JP | 2011195783 A | * | 10/2011 |
| JP | 2012126830 A | * | 7/2012 |

OTHER PUBLICATIONS

Derwent Abstract of JP 2005/120266, May 2005.*
Derwent Abstract of JP 2007/277314, Oct. 2007.*
Extended European Search Report (dated Jun. 8, 2011).

* cited by examiner

*Primary Examiner* — Helene Klemanski
(74) *Attorney, Agent, or Firm* — Nutter McClennen & Fish LLP; John J. Penny, V.

(57) ABSTRACT

An ink composition contains a particular anthrapyridone dye and a particular copper phthalocyanine dye. The hue angle in the L*a*b* color system calculated from spectral characteristics of a 1,000-fold diluted solution of the ink composition in water is 270° to 360°. The content of the anthrapyridone dye is higher than the content of the copper phthalocyanine dye.

10 Claims, No Drawings

INK COMPOSITION

BACKGROUND

1. Technical Field

The present invention relates to ink compositions, particularly, to an ink composition that allows formation of a recorded image with high color reproduction and light fastness.

2. Related Art

Recently, ink-jet recording with a plurality of color ink compositions has been employed to form a color image for production of a recorded material. Typically, a color image is formed using three ink compositions, namely, a yellow ink composition, a magenta ink composition, and a cyan ink composition, or four ink compositions further including a black ink composition as desired. In some cases, a color image is formed using six ink compositions including a light cyan ink composition and a light magenta ink composition in addition to the above four ink compositions, or seven ink compositions further including a dark yellow ink composition. Such combinations of two or more ink compositions are called ink sets.

Ink compositions used for forming a color image are required, for example, to have good color vividness on their own, to show a good intermediate color when combined, and to produce a recorded material that does not discolor or fade during storage.

In addition, recently, color ink-jet printers for "photo-quality" printing have been continuously improved in terms of printheads, ink compositions, recording systems, and media, and the quality thereof is comparable to "film photography." On the other hand, the storage stability of recorded images has been improved with improvements in ink compositions and media. The light fastness, particularly, has been improved to a practically acceptable level (see JP-A-2000-290559 and JP-A-2001-288392), although it is still not comparable to that of film photography. The light fastness performance is generally evaluated on the basis of the fading rates of pure yellow (Y), magenta (M), and cyan (C) patterns (with optical densities around 1.0). If this method is used to evaluate ink compositions charged into printers currently available on the market for light fastness performance, the magenta ink composition often has the lowest performance and determines the light fastness longevity of the entire ink set. Accordingly, improving the light fastness of the magenta ink composition is effective for improving the light fastness of a photographic image and prolonging the light fastness longevity of the ink set.

In addition, printed materials produced using such ink compositions may be placed not only indoors, but also outdoors, and may therefore be exposed not only to indoor light, but also to sunlight. Accordingly, there is a need for ink compositions having high light fastness.

As colorants with high light fastness, for example, compounds (azo dyes) disclosed in JP-A-2002-371079 and compounds (anthrapyridone dyes) disclosed in JP-A-2002-332419 have been proposed. In addition, a magenta ink composition with high light fastness containing two types of colorants in combination has been proposed (see JP-A-2005-105136). To the knowledge of the inventors, however, there has so far been no known ink composition that allows formation of a recorded image with both high light fastness and high color reproduction.

SUMMARY

The inventors have obtained the new finding that a recorded image with high color reproduction and light fastness can be formed using an ink composition which contains a particular anthrapyridone dye and a particular copper phthalocyanine dye, in which the hue angle in the $L^*a^*b^*$ color system calculated from spectral characteristics of a 1,000-fold diluted solution of the ink composition in water is 270° to 360°, and in which the content of the anthrapyridone dye is higher than the content of the copper phthalocyanine dye. The invention is based on this finding. It is thought in the related art that copper phthalocyanine dyes have a higher light fastness than anthrapyridone dyes. Accordingly, ink compositions containing both an anthrapyridone dye and a copper phthalocyanine dye in the related art are based on the concept that the copper phthalocyanine dye is responsible for the light fastness. For an ink composition according to an aspect of the invention, on the other hand, the content of an anthrapyridone dye, which has a lower light fastness, is higher than the content of a copper phthalocyanine dye, and the result is that the ink composition has significantly improved light fastness. The technical idea of employing such a proportion is opposite to the idea of the related art, and the effect is unexpected for those skilled in the art.

Accordingly, an advantage of some aspects of the invention is that it provides an ink composition that allows formation of a recorded image with high color reproduction and light fastness.

An ink composition according to an aspect of the invention contains an anthrapyridone dye and a copper phthalocyanine dye. The hue angle in the $L^*a^*b^*$ color system calculated from spectral characteristics of a 1,000-fold diluted solution of the ink composition in water is 270° to 360°. The content of the anthrapyridone dye is higher than the content of the copper phthalocyanine dye. The anthrapyridone dye is represented by formula (I):

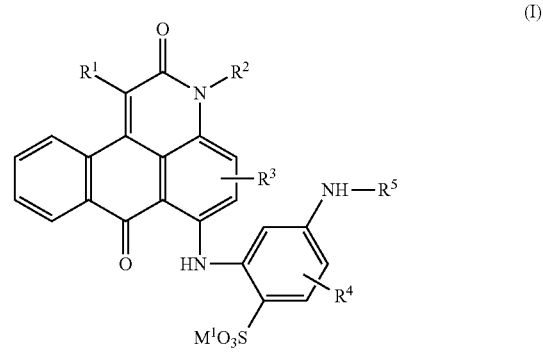

(I)

(wherein $M^1$ is hydrogen, $NH_4$, or sodium; $R^1$ is hydrogen, an optionally substituted alkyl group, an optionally substituted aryl group, or an optionally substituted benzoyl group; $R^2$ is hydrogen or an optionally substituted alkyl group; $R^3$ is hydrogen, a halogen, or an optionally substituted alkyl group; $R^4$ is hydrogen, an optionally substituted $NH_4$, or an optionally substituted sulfonic acid group; and $R^5$ is an acyl group or a group represented by formula (II):

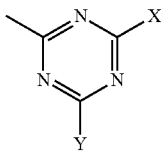

(wherein X and Y are each independently chlorine or a hydroxy, amino, monoethanolamino, diethanolamino, morpholino, anilino, or phenol group optionally substituted with one or more substituents)). The copper phthalocyanine dye is represented by formula (III):

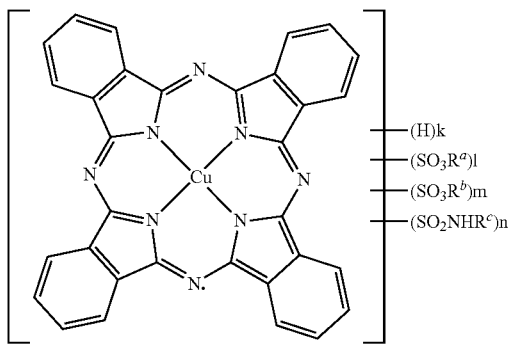

(wherein $R^a$ is hydrogen, an alkali metal, or $NH_4$; $R^b$ is an alkali metal or $NH_4$; $R^c$ is hydrogen, an optionally substituted alkyl group, or an optionally substituted aryl group; k, l, and n are each 0 to 3; m is a natural number of 1 to 4; and k+l+m+n=4).

According to the above aspect of the invention, an ink composition that allows formation of a recorded image with high color reproduction and light fastness can be provided.

DESCRIPTION OF EXEMPLARY EMBODIMENTS

An ink composition according to an embodiment of the invention contains an anthrapyridone dye represented by formula (I) above and a copper phthalocyanine dye represented by formula (III) above. The hue angle in the L*a*b* color system calculated from the spectral characteristics of a 1,000-fold diluted solution of the ink composition in water is 270° to 360°. The content of the anthrapyridone dye is higher than the content of the copper phthalocyanine dye. The ink composition according to the embodiment of the invention and the components contained therein will now be described.

Ink Composition

The hue angle in the L*a*b* color system calculated from the spectral characteristics of a 1,000-fold diluted solution of the ink composition according to the embodiment of the invention in water is 270° to 360°. Preferably, the hue angle is 320° to 350°. If the hue angle falls within this range, a recorded image with higher color reproduction and light fastness can be formed.

In the embodiment of the invention, the hue angle of the ink composition can be specified by the color difference method using the L*a*b* color system standardized by CIE (Commission International del'Eclairage) and employed by JIS (Japanese Industrial Standards) (namely, JIS Z 8729).

As used herein, the term "hue angle in the L*a*b* color system calculated from the spectral characteristics of a 1,000-fold diluted solution of the ink composition in water" refers to a hue angle determined by diluting the ink composition of interest 1,000-fold on a volume basis with water, subjecting the diluted solution to spectrometry using a spectrophotometer (cell used: quartz cell with optical path length of 1 cm), calculating the L* (lightness), a*, and b* of the diluted solution in the L*a*b* color system from the measurements, and substituting the a* and b* into the following equation:

Hue angle=360+tan(b*/a*) if a*>0 and b*<0

360−tan(b*/a*) if a*<0 and b*<0

The water used for dilution may be pure or ultrapure water such as ion exchange water, ultrafiltrated water, reverse osmosis water, or distilled water.

On the other hand, the chroma (C*), which indicates the distance from the origin ((a*,b*)=(0,0)), is calculated by equation (i):

$$\text{Chroma } (C^*)=((a^*)^2+(b^*)^2)^{1/2} \quad (i)$$

Colorants

Anthrapyridone Dye

The ink composition according to the embodiment of the invention contains an anthrapyridone dye represented by formula (I) above.

Examples of anthrapyridone dyes preferred in the embodiment of the invention include compounds represented by formula (I) above wherein $M^1$ is $NH_4$ or sodium; $R^1$ is hydrogen or an optionally substituted benzoyl group (preferably, a benzoyl group substituted with a sulfonic acid group (the sulfonic acid group is optionally substituted with $NH_4$ or sodium)); $R^2$ is an optionally substituted alkyl group (preferably, an alkyl group having one to three carbon atoms, more preferably a methyl group); $R^3$ is hydrogen; $R^4$ is an optionally substituted sulfonic acid group (preferably, a sulfonic acid group substituted with $NH_4$ or sodium); and $R^5$ is a group represented by formula (II) above (preferably, in formula (II), X and Y are each independently a hydroxy, amino, anilino, or phenol group (more preferably, a phenol group substituted with a carboxyl group (the carboxyl group is optionally substituted with $NH_4$ or sodium)) optionally substituted with one or more substituents).

In the embodiment of the invention, the anthrapyridone dye represented by formula (I) above is preferably a mixture of a compound represented by formula (I) above wherein $M^1$ is $NH_4$ and a compound represented by formula (I) above wherein $M^1$ is sodium. More preferably, the anthrapyridone dye represented by formula (I) above is a mixture of a compound represented by formula (I) above wherein $M^1$ is $NH_4$ and a compound represented by formula (I) above wherein $M^1$ is sodium in a ratio (molar ratio) of 6:4 to 8:2. Most preferably, the anthrapyridone dye represented by formula (I) above is a mixture of a compound represented by formula (I) above wherein $M^1$ is $NH_4$ and a compound represented by formula (I) above wherein $M^1$ is sodium in a ratio (molar ratio) of 7:3.

In the embodiment of the invention, the anthrapyridone dye represented by formula (I) above is preferably a compound represented by formula (IV):

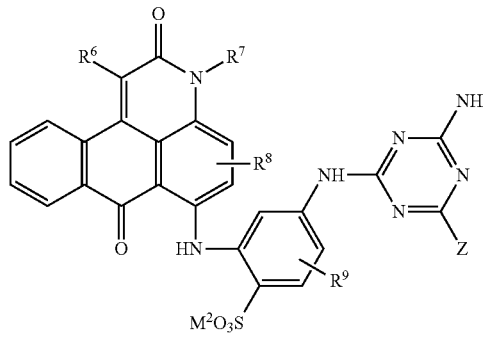
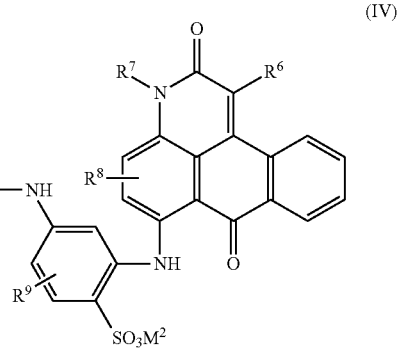

(IV)

(wherein $M^2$ is hydrogen, $NH_4$, or sodium; $R^6$ is hydrogen, an optionally substituted alkyl group, an optionally substituted aryl group, or an optionally substituted benzoyl group; $R^7$ is hydrogen or an optionally substituted alkyl group; $R^8$ is hydrogen, a halogen, or an optionally substituted alkyl group; $R^9$ is hydrogen, an optionally substituted $NH_4$, or an optionally substituted sulfonic acid group; A is an alkylene group, an alkylene group having a phenylene group, or a group represented by formula (V):

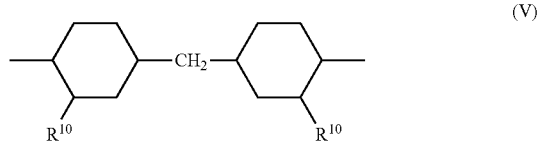

(V)

(wherein $R^{10}$ is hydrogen or an alkyl group); and Z is chlorine or a hydroxy, amino, monoethanolamino, diethanolamino, morpholino, anilino, or phenol group optionally substituted with one or more substituents).

Examples of anthrapyridone dyes preferred in the embodiment of the invention include compounds represented by formula (IV) above wherein $M^2$ is $NH_4$ or sodium; $R^6$ is an optionally substituted benzoyl group (preferably, a benzoyl group substituted with a sulfonic acid group (the sulfonic acid group is optionally substituted with $NH_4$ or sodium)); $R^7$ is an optionally substituted alkyl group (preferably, an alkyl group having one to three carbon atoms, more preferably a methyl group); $R^8$ is hydrogen; $R^9$ is an optionally substituted sulfonic acid group (preferably, a sulfonic acid group substituted with $NH_4$ or sodium); A is an alkylene group or a group represented by formula (V) above (preferably, wherein $R^{10}$ is hydrogen); and Z is an amino or phenol group (more preferably, a phenol group substituted with a carboxyl group (the carboxyl group is optionally substituted with $NH_4$ or sodium)) optionally substituted with one or more substituents).

In the embodiment of the invention, the anthrapyridone dye contained in the ink composition is preferably a mixture of a compound represented by formula (IV) above wherein $M^2$ is $NH_4$ and a compound represented by formula (IV) above wherein $M^2$ is sodium. More preferably, the anthrapyridone dye contained in the ink composition is a mixture of a compound represented by formula (IV) above wherein $M^2$ is $NH_4$ and a compound represented by formula (IV) above wherein $M^2$ is sodium in a ratio (molar ratio) of 6:4 to 8:2. Most preferably, the anthrapyridone dye contained in the ink composition is a mixture of a compound represented by formula (IV) above wherein $M^2$ is $NH_4$ and a compound represented by formula (IV) above wherein $M^2$ is sodium in a ratio (molar ratio) of 7:3.

In the embodiment of the invention, the anthrapyridone dye represented by formula (I) or (IV) above is more preferably a compound represented by formula (VI):

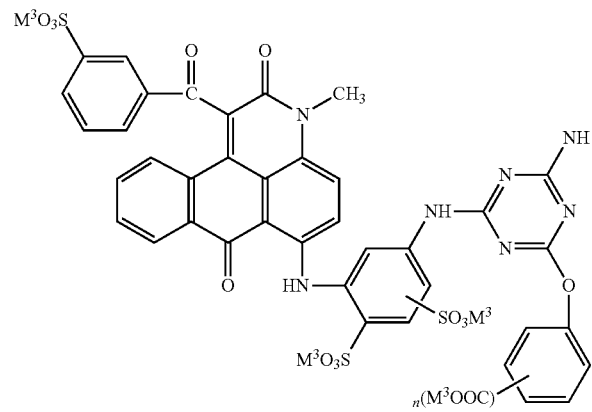
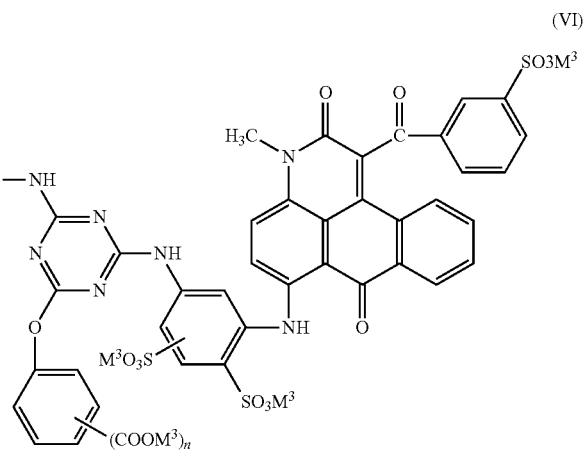

(VI)

(wherein $M^3$ is hydrogen, $NH_4$, or sodium; B is an alkylene group; and n is 1 or 2).

Examples of anthrapyridone dyes preferred in the embodiment of the invention include compounds represented by formula (VI) above wherein $M^3$ is $NH_4$ or sodium; B is an alkylene group (preferably, an ethylene group); and n=2.

In the embodiment of the invention, the anthrapyridone dye contained in the ink composition is preferably a mixture of a compound represented by formula (VI) above wherein $M^3$ is $NH_4$ and a compound represented by formula (VI) above wherein $M^3$ is sodium. More preferably, the anthrapyridone dye contained in the ink composition is a mixture of a compound represented by formula (VI) above wherein $M^3$ is $NH_4$ and a compound represented by formula (VI) above wherein $M^3$ is sodium in a ratio (molar ratio) of 6:4 to 8:2. Most preferably, the anthrapyridone dye contained in the ink composition is a mixture of a compound represented by formula (VI) above wherein $M^3$ is $NH_4$ and a compound represented by formula (VI) above wherein $M^3$ is sodium in a ratio (molar ratio) of 7:3.

In the embodiment of the invention, additionally, the anthrapyridone dye represented by formula (I) above is preferably a compound of formula (VII):

(VII)

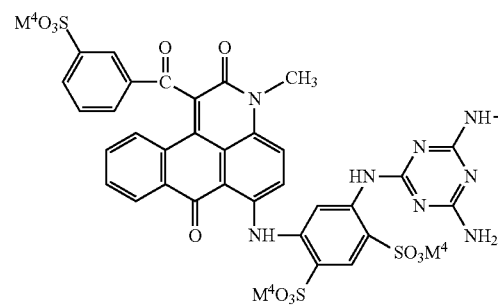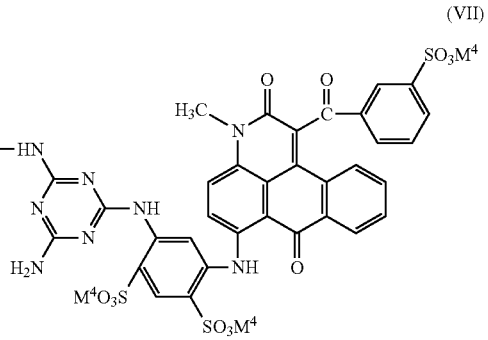

(wherein $M^4$ is hydrogen, $NH_4$, or sodium). If the ink composition according to the embodiment of the invention contains the above compound, a recorded image with high color reproduction and light fastness can be formed.

In the embodiment of the invention, furthermore, the anthrapyridone dye contained in the ink composition is preferably a mixture of a compound represented by formula (VII) above wherein $M^4$ is $NH_4$ and a compound represented by formula (VII) above wherein $M^4$ is sodium. More preferably, the anthrapyridone dye contained in the ink composition is a mixture of a compound represented by formula (VII) above wherein $M^4$ is $NH_4$ and a compound represented by formula (VII) above wherein $M^4$ is sodium in a ratio (molar ratio) of 6:4 to 8:2. Most preferably, the anthrapyridone dye contained in the ink composition is a mixture of a compound represented by formula (VII) above wherein $M^4$ is $NH_4$ and a compound represented by formula (VII) above wherein $M^4$ is sodium in a ratio (molar ratio) of 7:3.

In the embodiment of the invention, additionally, the anthrapyridone dye represented by formula (I) above is preferably a compound of formula (VIII):

(VII)

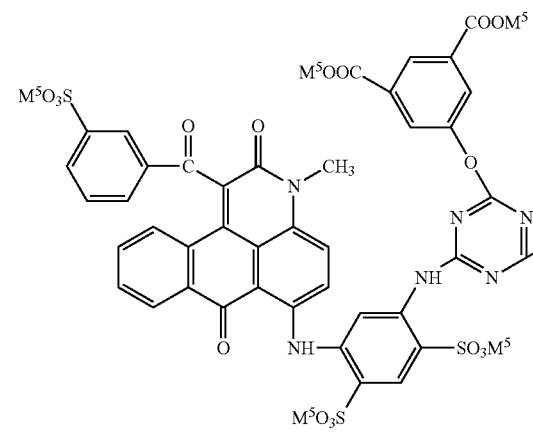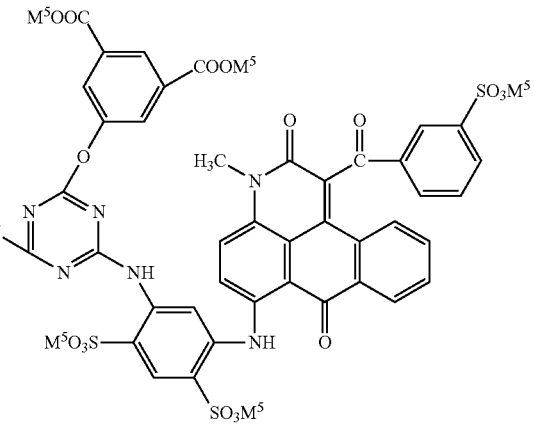

(wherein $M^5$ is hydrogen, $NH_4$, or sodium). If the ink composition according to the embodiment of the invention contains the above compound, a recorded image with high color reproduction and light fastness can be formed.

In the embodiment of the invention, furthermore, the anthrapyridone dye contained in the ink composition is preferably a mixture of a compound represented by formula (VIII) above wherein $M^5$ is $NH_4$ and a compound represented by formula (VIII) above wherein $M^5$ is sodium. More preferably, the anthrapyridone dye contained in the ink composition is a mixture of a compound represented by formula (VIII) above wherein $M^5$ is $NH_4$ and a compound represented by formula (VIII) above wherein $M^5$ is sodium in a ratio (molar ratio) of 6:4 to 8:2. Most preferably, the anthrapyridone dye contained in the ink composition is a mixture of a compound represented by formula (VIII) above wherein $M^5$ is $NH_4$ and a compound represented by formula (VIII) above wherein $M^5$ is sodium in a ratio (molar ratio) of 7:3.

In the embodiment of the invention, additionally, the anthrapyridone dye represented by formula (I) above is preferably a compound of formula (IX):

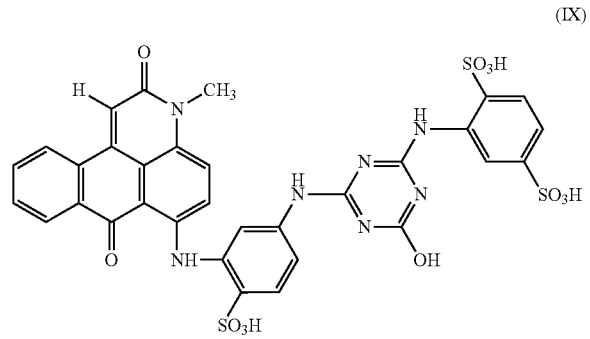

(IX)

If the ink composition according to the embodiment of the invention contains the above compound, a recorded image with high color reproduction and light fastness can be formed.

The content of the anthrapyridone dye is not particularly limited as long as a recorded image with high color reproduction and light fastness can be formed. The content of the anthrapyridone dye is preferably 1% to 10% by mass, more preferably 4% to 10% by mass, of the ink composition. If the content of the anthrapyridone dye falls within such a range, a recorded image with higher color reproduction and light fastness can be formed.

The content of the anthrapyridone dye in the ink composition according to the embodiment of the invention is higher than the content of the copper phthalocyanine dye, described below. Preferably, the ratio (A/B) of the content of the anthrapyridone dye (A) to the content of the copper phthalocyanine dye (B) (magenta dye content/cyan dye content) is 1.1 to 100, more preferably 2.5 to 100, and most preferably 10 to 100. If the ratio falls within such a range, a recorded image with higher color reproduction and light fastness can be formed.

Copper Phthalocyanine Dye

The ink composition according to the embodiment of the invention contains a copper phthalocyanine dye represented by formula (III) above.

Examples of copper phthalocyanine dyes preferred in the embodiment of the invention include C.I. Direct Blue 199 and the compound of formula (X):

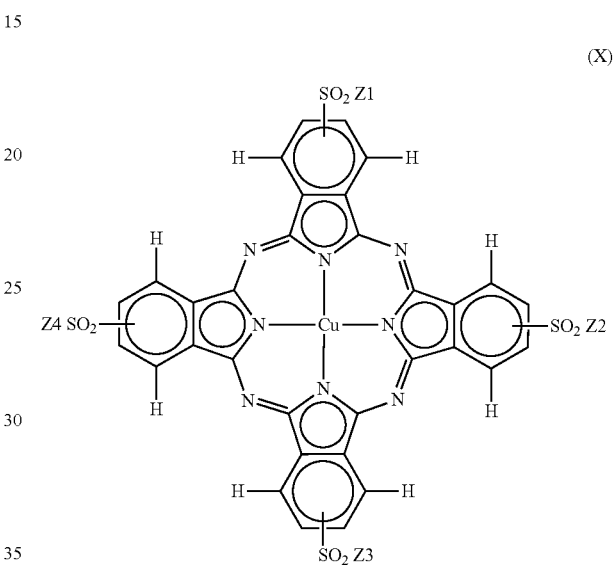

(X)

(wherein Z1, Z2, Z3, and Z4 are as follows.)

| Z1 | Z2 | Z3 | Z4 |
|---|---|---|---|
| —$(CH_2)_3SO_3Li$ | —$(CH_2)_3SO_3Li$ | —$(CH_2)_3SO_3Li$ | —$(CH_2)_3SO_2NHCH_2CH(OH)CH_3$ |

Of these, the compound of formula (X) is more preferable. If the ink composition according to the embodiment of the invention contains the above compound, a recorded image with higher color reproduction and light fastness can be formed.

In the embodiment of the invention, the content of the copper phthalocyanine dye in the ink composition is preferably 0.05% to 2.0% by mass, more preferably 0.05% to 1.0% by mass, of the ink composition. If the content of the copper phthalocyanine dye falls within such a range, a recorded image with higher color reproduction and light fastness can be formed.

Water, Water-Soluble Organic Solvent, and Other Optional Components

The ink composition according to the embodiment of the invention contains water or an aqueous medium containing water and a water-soluble organic solvent, contains the dyes represented by formulas (I) and (III) above as colorants, and optionally contains additives such as a humectant, a surfactant, a permeation enhancer, a viscosity modifier, and a pH adjustor.

The ink composition according to the embodiment of the invention can be prepared by dissolving the above colorants (dyes) in an appropriate solvent. In the ink composition, water or a mixture of water and a water-soluble organic solvent is preferably used as a main solvent for dissolving the colorants. The water used may be, for example, ion exchange water, ultrafiltrated water, reverse osmosis water, or distilled water. For long-term preservation, water subjected to ultraviolet irradiation or chemical sterilization treatment such as addition of hydrogen peroxide is preferably used. The content of water in the ink composition according to the embodiment of the invention is preferably 40% to 90% by mass, more preferably 50% to 80% by mass, of the ink composition.

The ink composition according to the embodiment of the invention, as described above, may contain a water-soluble organic solvent as a solvent together with water. The water-soluble organic solvent used is preferably one capable of dissolving the dyes and having a vapor pressure lower than that of pure water.

Examples of water-soluble organic solvents used in the embodiment of the invention include, but are not limited to, polyalcohols such as ethylene glycol, propylene glycol, butanediol, pentanediol, 2-butene-1,4-diol, 2-methyl-2,4-pentanediol, glycerol, 1,2,6-hexanetriol, diethylene glycol, triethylene glycol, and dipropylene glycol; ketones such as acetonylacetone; esters such as γ-butyrolactone and triethyl phosphate; and other solvents such as furfuryl alcohol, tetrahydrofurfuryl alcohol, and thiodiglycol. The use of a water-soluble organic solvent as a solvent of the ink composition together with water allows various adjustments, such as improving the stability of the ejection of the ink composition from an ink head and decreasing the viscosity of the ink composition without substantially changing the other properties, to be readily performed.

In addition, the ink composition according to the embodiment of the invention may contain at least one humectant selected from the group consisting of saccharides. If an ink composition containing a humectant is used for ink-jet recording, it inhibits evaporation of moisture from the ink to maintain moisture in the ink. Examples of saccharides preferred in the embodiment of the invention include maltitol, sorbitol, gluconolactone, and maltose. The water-soluble organic solvents described above may also serve as a humectant.

The ink composition may contain the water-soluble organic solvent and/or the humectant in a total amount of 5% to 50% by mass, more preferably 5% to 30% by mass, and most preferably 5% to 20% by mass. If the content is 5% by mass or more, the ink composition has good moisture retention. In addition, if the content is 50% by mass or less, the ink composition has viscosity preferred for ink-jet recording.

The surfactant contained in the ink composition according to the embodiment of the invention is preferably, but not limited to, a nonionic surfactant. If a nonionic surfactant is added to the ink composition, it has high permeability into a recording medium and can therefore be quickly fixed on a recording medium in printing. In addition, it is preferable that a dot of ink composition on a recording medium be as close to a perfect circle as possible; if the ink composition contains a nonionic surfactant, a dot image closer to a perfect circle can be formed, thus improving the quality of a recorded image.

Examples of nonionic surfactants that can be used in the embodiment of the invention include acetylene glycol surfactants. Examples of acetylene glycol surfactants include Surfynol 465 and 104 (available from Air Products and Chemicals Inc.) and Olfine E1010, PD001, and STG (available from Nissin Chemical Industry Co., Ltd.; trade names). The amount of nonionic surfactant added is preferably 0.1% to 5.0% by mass, more preferably 0.5% to 3.0% by mass. If the amount of nonionic surfactant added is 0.1% by mass or more, the ink composition has sufficient permeability. In addition, if the amount of nonionic surfactant added is 5.0% by mass or less, image blurring can be easily prevented.

If a glycol ether is added as a permeation enhancer to the ink composition in addition to a nonionic surfactant, it improves the permeability of the ink composition into a recording medium and reduces bleeding at boundaries between adjacent color inks in color printing, thus providing a very sharp image. Thus, a nonionic surfactant is preferably added to the ink composition according to the embodiment of the invention.

Examples of glycol ethers preferred as a permeation enhancer in the embodiment of the invention include, but are not limited to, ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, and triethylene glycol monobutyl ether. The glycol ether is preferably contained in the ink composition in an amount of 3% to 30% by mass, more preferably 5% to 15% by mass. If the amount of glycol ether added is 3% by mass or more, bleeding between adjacent inks in color printing can be effectively prevented. In addition, if the amount of glycol ether added is 30% by mass or less, image blurring can be more readily prevented, and the storage stability of the ink can be improved.

In addition, the ink composition according to the embodiment of the invention may optionally contain other materials, including pH adjusters such as triethanolamine and alkali metal hydroxides, water-soluble polymers such as sodium alginate, water-soluble resins, fluorocarbon surfactants, preservatives, fungicides, rust inhibitors, dissolution aids, antioxidants, and ultraviolet absorbers. These components may be used alone or as a mixture of two or more for each type of component, or may be omitted if unnecessary. Those skilled in the art can use preferred amounts of selected preferred additives without impairing the advantages of the embodiment of the invention. A dissolution aid is an additive for dissolving any insoluble residue in the ink composition to keep the ink composition homogeneous.

Examples of dissolution aids include, but are not limited to, pyrrolidones such as N-methyl-2-pyrrolidone and 2-pyrrolidone; ureas such as urea, thiourea, and tetramethylurea; allophanates such as allophanate and methyl allophanate; biurets such as biuret, dimethyl biuret, and tetramethyl biuret. Examples of antioxidants include, but are not limited to, L-ascorbic acid and salts thereof.

Examples of preservatives and fungicides include, but are not limited to, sodium benzoate, sodium pentachlorophenol, sodium-2-pyridinethiol-1-oxide, sodium sorbate, sodium dehydroacetate, and 1,2-benzothiazolin-3-on (e.g., Proxel CRL, BDN, GXL, XL-2, and TN (trade names; available from Avecia Ltd.).

Examples of pH adjusters include, but are not limited to, amines such as diethanolamine, triethanolamine, propanolamine, and morpholine and modified amines; metal hydroxides such as potassium hydroxide, sodium hydroxide, and lithium hydroxide; ammonium salts such as ammonium hydroxide and quaternary ammonium hydroxides (e.g., tetramethylammonium); carbonate salts such as potassium carbonate, sodium carbonate, and lithium carbonate; and phosphate salts.

Whereas the ink composition according to the embodiment of the invention is prepared using components appropriately selected from the above components, the ink composition preferably has a viscosity of less than 10 mPa·s at 20° C. In the embodiment of the invention, additionally, the ink composition preferably has a surface tension of 45 mN/m or less, more preferably 25 to 45 mN/m, at 20° C. If the viscosity and the surface tension are adjusted in this way, an ink composition having properties preferred for ink-jet recording can be achieved. The viscosity and the surface tension can be adjusted by appropriately selecting and adjusting the types and amounts of solvents and additives contained in the ink composition.

The ink composition according to the embodiment of the invention preferably has a pH of 7.0 to 10.5, more preferably 7.5 to 10.0, at 20° C. If the pH is 7.0 or more at 20° C., it is possible to prevent peeling of eutectoid plating on an ink-jet head and to stabilize the ejection of the ink composition from an ink-jet head. In addition, if the pH is 10.5 or less at 20° C., it is possible to prevent degradation of various members that come into contact with the ink composition, including the components of an ink cartridge and an ink-jet head.

The ink composition according to the embodiment of the invention can be prepared by, for example, sufficiently mixing and dissolving the components to be contained in the ink composition as homogeneously as possible, filtering the solution through a membrane filter having a pore size of 0.8 μm with pressure, and degassing the solution using a vacuum pump, although the method for preparing the ink composition is not limited thereto.

EXAMPLES

The invention will now be described in greater detail in the following examples, although they are not intended to limit the invention.

Preparation of Ink Composition

Ink compositions were prepared by stirring the compositions shown in Tables 1 and 2 below at room temperature for one hour and filtering them through a 0.8 μm membrane filter. In Tables 1 and 2 below, the values indicate the contents (% by mass) of the individual components in the inks, and Olfine E1010 is available from Nissin Chemical Industry Co., Ltd.

TABLE 1

(Unit: % by mass)

|  | Ref. 1 | Ref. 2 | Ref. 3 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|
| Magenta Dye 1 (compound of formula (VIII))* | 5 | — | — | 5 | — | 5 | — | 5 | 5 | 5 | 5 | — |
| Magenta Dye 2 (compound of formula (IX)) | — | 5 | — | — | 5 | — | 5 | — | — | — | — | — |
| Magenta Dye 3 (C.I. Acid Red 289) | — | — | 5 | — | — | — | — | — | — | — | — | 5 |
| Cyan Dye 1 (compound of formula (X)) | — | — | — | 0.5 | 0.5 | — | — | 0.03 | 0.8 | 1.5 | — | — |
| Cyan Dye 2 (C.I. Direct Blue 199) | — | — | — | — | — | 0.5 | 0.5 | — | — | — | — | 0.5 |
| Cyan Dye 3 (C.I. Acid Blue 9) | — | — | — | — | — | — | — | — | — | — | 0.5 | — |
| Triethylene glycol monobutyl ether | 10 | 10 | 10 | 10 | 10 | 10 | 10 | 10 | 10 | 10 | 10 | 10 |
| Glycerol | 10 | 10 | 10 | 10 | 10 | 10 | 10 | 10 | 10 | 10 | 10 | 10 |
| Triethylene glycol | 6 | 6 | 6 | 6 | 6 | 6 | 6 | 6 | 6 | 6 | 6 | 6 |
| Olfine E1010 | 2 | 2 | 2 | 2 | 2 | 2 | 2 | 2 | 2 | 2 | 2 | 2 |
| Distilled water | Balance | Balance | Balance | Balance | Balance | Balance | Balance | Balance | Balance | Balance | Balance | Balance |
| Total | 100 | 100 | 100 | 100 | 100 | 100 | 100 | 100 | 100 | 100 | 100 | 100 |

*The compound of formula (VIII) is a mixture of a compound of formula (VIII) wherein $M^5$ is $NH_4$ and a compound of formula (VIII) wherein $M^5$ is sodium in a ratio (molar ratio) of 7:3.

TABLE 2

(Unit: % by mass)

|  | Ref. 4 | Ref. 5 | Ex. 10 | Ex. 11 | Ex. 12 | Ex. 13 | Ex. 14 | Ex. 15 | Ex. 16 |
|---|---|---|---|---|---|---|---|---|---|
| Magenta Dye 1 (compound of formula (VIII))* | 2 | — | 2 | 5 | — | 5 | — | 2 | — |
| Magenta Dye 2 (compound of formula (IX)) | — | — | — | — | 5 | — | 5 | — | — |
| Magenta Dye 3 (C.I. Acid Red 289) | — | 2 | — | — | — | — | — | — | 2 |
| Cyan Dye 1 (compound of formula (X)) | — | — | 0.2 | 2 | 2 | — | — | — | — |
| Cyan Dye 2 (C.I. Direct Blue 199) | — | — | — | — | — | 2 | 2 | 5 | 5 |
| Cyan Dye 3 (C.I. Acid Blue 9) | — | — | — | — | — | — | — | — | — |
| Triethylene glycol monobutyl ether | 10 | 10 | 10 | 10 | 10 | 10 | 10 | 10 | 10 |
| Glycerol | 10 | 10 | 10 | 10 | 10 | 10 | 10 | 10 | 10 |
| Triethylene glycol | 6 | 6 | 6 | 6 | 6 | 6 | 6 | 6 | 6 |
| Olfine E1010 | 2 | 2 | 2 | 2 | 2 | 2 | 2 | 2 | 2 |
| Distilled water | Balance | Balance | Balance | Balance | Balance | Balance | Balance | Balance | Balance |
| Total | 100 | 100 | 100 | 100 | 100 | 100 | 100 | 100 | 100 |

*The compound of formula (VIII) is a mixture of a compound of formula (VIII) wherein $M^5$ is $NH_4$ and a compound of formula (VIII) wherein $M^5$ is sodium in a ratio (molar ratio) of 7:3.

Characteristics Determined from Diluted Solution of Ink Composition in Water

The spectral characteristics of diluted solutions of the ink compositions (Exs. 1 to 16 and Refs. 1 to 3) in water were measured using a spectrophotometer (the trade name U-3000, available from Hitachi, Ltd.). For the measurement, 1 mL of ink composition was diluted with ion exchange water to 1,000 mL and was charged into a quartz cell having an optical path length of 1 cm, and the measurement was carried out in a transmission mode. The $L^*$, $a^*$, and $b^*$ of the ink compositions were determined from the measured spectral characteristics using a color analysis program (included with U-3000). $C^*$ and the hue angle were determined as described above. The evaluation results are shown in Tables 3 and 4 below.

Method for Printing Test

Ink cartridges filled with the ink compositions (Exs. 1 to 16 and Refs. 1 to 3) were charged into a PM-G800 ink-jet printer (available from Seiko Epson Corporation) to perform printing on paper for evaluation (Premium Glossy Photo Paper CRISPIA, available from Seiko Epson Corporation). When the blue inks were used, ink cartridges for PM-G800 were filled with the blue inks and were set to the position for ICLC32 on the carriage, a black ink cartridge for PM-G800 (ICBK32, available from Seiko Epson Corporation) and color ink cartridges for PM-G800 (ICC32, ICM32, and ICY32, available from Seiko Epson Corporation) were set to the respective positions on the carriage, and the required inks were supplied therefrom to the head. An empty ink cartridge was set to the position for ICLM32 on the carriage. For printing, a printer driver for blue inks was created and used.

Evaluation of Color Reproduction

Solid printing (100% duty) of the individual colors (magenta alone for the magenta inks, light magenta alone for the light magenta inks, and blue alone for the blue inks) was performed on ink-jet photo paper (Photo Paper CRISPIA, available from Seiko Epson Corporation), and the printouts were visually evaluated for color vividness and hue on the basis of the following criteria:

A: Acceptable in terms of both color vividness and hue
B: Acceptable in terms of either color vividness or hue
C: Unacceptable in terms of both color vividness and hue The evaluation results are shown in Tables 3 and 4 below.

Image Light Fastness

The above printouts were exposed at a temperature of 24° C., a relative humidity of 60% RH, and an illuminance of 70,000 lux for 16, 18, and 20 days using the fluorescent lamp light fastness tester STF-11 (trade name; available from Suga Test Instruments Co., Ltd.). After the exposure, the optical density (OD) of each printout was measured using a reflection densitometer (the trade name "Spectrilino," available from Gretag Macbeth AG), and the relict optical density (ROD) was determined by the following equation:

ROD (%)=$(D/D_0)\times 100$ wherein D is the OD after the exposure test and $D_0$ is the OD before the exposure test (measurement conditions: light source: D50; viewing angle: 2°). The results were evaluated on the basis of the following criteria:

A: ROD of 80% or more after exposure for 20 days
B: ROD of 80% or more after exposure for 18 days and ROD of less than 80% after exposure for 20 days
C: ROD of 80% or more after exposure for 16 days and ROD of less than 80% after exposure for 18 days
D: ROD of less than 80% after exposure for 16 days The evaluation results are shown in Tables 3 and 4 below.

Improvement in Image Light Fastness

Each "ink containing a cyan dye" (Exs. 1 to 16) was evaluated as A if the light fastness thereof was at least two ranks higher than that of the "ink containing no cyan dye" (Refs. 1 to 5), was evaluated as B if the light fastness thereof was one rank higher, and was evaluated as C if the light fastness thereof was at the same rank or one rank lower. Ref. 1 was used as the "ink containing no cyan dye" to evaluate Exs. 1, 3, 5 to 8, 11, and 13. Ref. 2 was used as the "ink containing no cyan dye" to evaluate Exs. 2, 4, 12, and 14. Ref. 3 was used as the "ink containing no cyan dye" to evaluate Ex. 9. Ref. 4 was used as the "ink containing no cyan dye" to evaluate Exs. 10 and 15. Ref. 5 was used as the "ink containing no cyan dye" to evaluate Ex. 16. The evaluation results are shown in Tables 3 and 4 below.

TABLE 3

|  | Ref. 1 | Ref. 2 | Ref. 3 | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- | --- | --- |
| Hue angle | 348 | 354 | 352 | 337 | 333 | 340 | 340 | 347 | 331 | 320 | 348 | 337 |
| Magenta dye content/cyan dye content | ∞ | ∞ | ∞ | 10 | 10 | 10 | 10 | 167 | 6.25 | 3 | 10 | 10 |
| Color reproduction | A | B | A | A | B | A | B | A | B | B | A | A |
| Image light fastness | C | D | D | A | B | A | B | B | A | A | D | D |
| Improvement in image light fastness | — | — | — | A | A | A | A | B | A | A | C | C |

TABLE 4

|  | Ref. 4 | Ref. 5 | Ex. 10 | Ex. 11 | Ex. 12 | Ex. 13 | Ex. 14 | Ex. 15 | Ex. 16 |
| --- | --- | --- | --- | --- | --- | --- | --- | --- | --- |
| Hue angle | 346 | 352 | 336 | 313 | 319 | 309 | 315 | 267 | 314 |
| Magenta dye content/cyan dye content | ∞ | ∞ | 10 | 2.5 | 2.5 | 2.5 | 2.5 | 0.4 | 2.5 |
| Color reproduction | A | A | A | B | B | B | B | C | B |
| Image light fastness | B | D | A | A | B | A | B | A | C |
| Improvement in image light fastness | — | — | B | A | A | A | A | B | B |

What is claimed is:

1. An ink composition comprising an anthrapyridone dye and a copper phthalocyanine dye, wherein the hue angle in the L*a*b* color system calculated from spectral characteristics of a 1,000-fold diluted solution of the ink composition in water is 270° to 360° and wherein the content of the anthrapyridone dye is higher than the content of the copper phthalocyanine dye, the anthrapyridone dye being represented by formula (I):

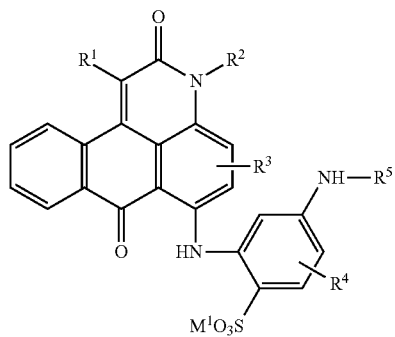

wherein $M^1$ is hydrogen, $NH_4$, or sodium; $R^1$ is hydrogen, an optionally substituted alkyl group, an optionally substituted aryl group, or an optionally substituted benzoyl group; $R^2$ is hydrogen or an optionally substituted alkyl group; $R^3$ is hydrogen, a halogen, or an optionally substituted alkyl group; $R^4$ is hydrogen, an optionally substituted $NH_4$, or an optionally substituted sulfonic acid group; and $R^5$ is an acyl group or a group represented by formula (II):

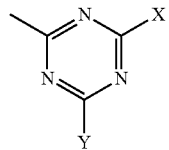

(wherein X and Y are each independently chlorine or a hydroxy, amino, monoethanolamino, diethanolamino, morpholino, anilino, or phenol group optionally substituted with one or more substituents), the copper phthalocyanine dye being represented by formula (III):

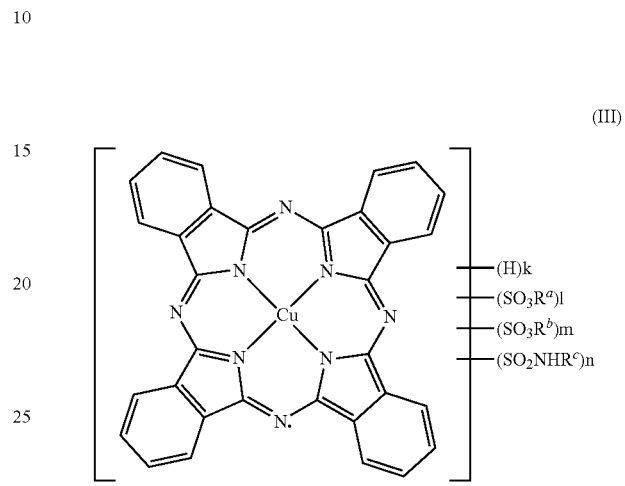

wherein $R^a$ is hydrogen, an alkali metal, or $NH_4$; $R^b$ is an alkali metal or $NH_4$; $R^c$ is hydrogen, an optionally substituted alkyl group, or an optionally substituted aryl group; k, l, and n are each 0 to 3; m is a natural number of 1 to 4; and k+l+m+n=4.

2. The ink composition according to claim 1, wherein the anthrapyridone dye is a compound represented by formula (IV):

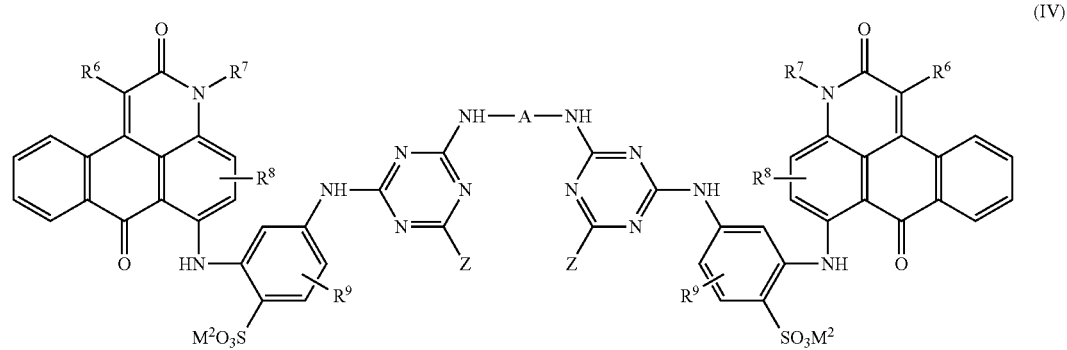

wherein $M^2$ is hydrogen, $NH_4$, or sodium; $R^6$ is hydrogen, an optionally substituted alkyl group, an optionally substituted aryl group, or an optionally substituted benzoyl group; $R^7$ is hydrogen or an optionally substituted alkyl group; $R^8$ is hydrogen, a halogen, or an optionally substituted alkyl group; $R^9$ is hydrogen, an optionally substituted $NH_4$, or an optionally substituted sulfonic acid group; A is an alkylene group, an alkylene group having a phenylene group, or a group represented by formula (V):

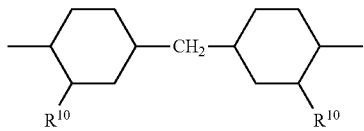
(V)

(wherein $R^{10}$ is hydrogen or an alkyl group); and Z is chlorine or a hydroxy, amino, monoethanolamino, diethanolamino, morpholino, anilino, or phenol group optionally substituted with one or more substituents.

3. The ink composition according to claim 1, wherein the anthrapyridone dye is a compound represented by formula (VI):

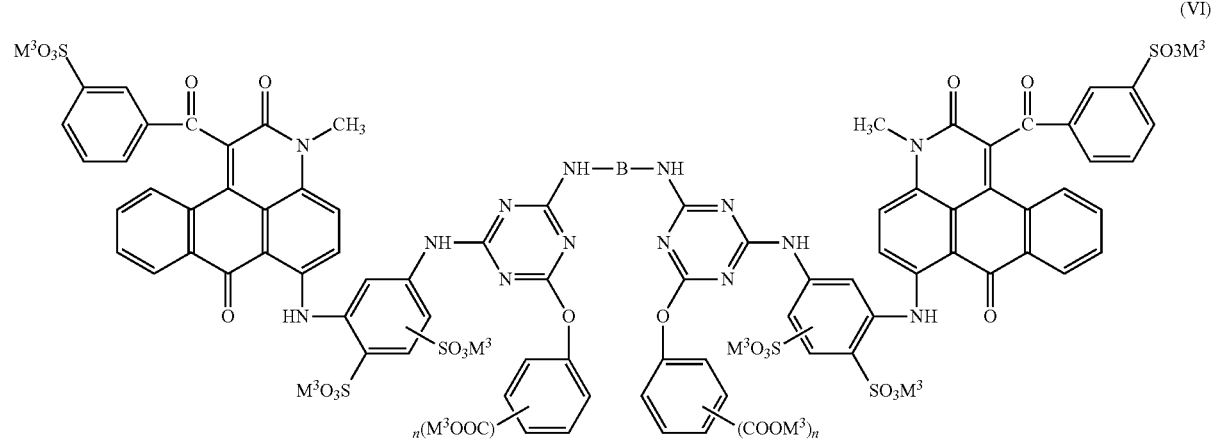
(VI)

wherein $M^3$ is hydrogen, $NH_4$, or sodium; B is an alkylene group; and n is 1 or 2.

4. The ink composition according to claim 1, wherein the content of the anthrapyridone dye is 1% to 10% by mass of the ink composition.

5. The ink composition according to claim 1, wherein the content of the anthrapyridone dye is 4% to 10% by mass of the ink composition.

6. The ink composition according to claim 1, wherein the content of the copper phthalocyanine dye is 0.05% to 2.0% by mass of the ink composition.

7. The ink composition according to claim 1, wherein the content of the copper phthalocyanine dye is 0.05% to 1.0% by mass of the ink composition.

8. The ink composition according to claim 1, wherein the ratio (A/B) of the content of the anthrapyridone dye (A) to the content of the copper phthalocyanine dye (B) is 1.1 to 100.

9. The ink composition according to claim 8, wherein the ratio is 2.5 to 100.

10. The ink composition according to claim 8, wherein the ratio is 10 to 100.

* * * * *